US011156265B2

(12) United States Patent
 Mergens (10) Patent No.: US 11,156,265 B2
(45) Date of Patent: Oct. 26, 2021

(54) CABLE RAILING SYSTEM AND METHOD OF INSTALLATION

(71) Applicant: Devin Mergens, Provo, UT (US)

(72) Inventor: Devin Mergens, Provo, UT (US)

( * ) Notice: Subject to any disclaimer, the term of this patent is extended or adjusted under 35 U.S.C. 154(b) by 634 days.

(21) Appl. No.: 16/116,770

(22) Filed: Aug. 29, 2018

(65) Prior Publication Data

US 2019/0078647 A1    Mar. 14, 2019

Related U.S. Application Data

(60) Provisional application No. 62/558,240, filed on Sep. 13, 2017.

(51) Int. Cl.
| *F16G 11/12* | (2006.01) |
| *E04F 11/18* | (2006.01) |
| *E04H 17/10* | (2006.01) |
| *F16G 11/04* | (2006.01) |
| *E04H 17/24* | (2006.01) |

(52) U.S. Cl.
CPC .......... *F16G 11/12* (2013.01); *E04F 11/1859* (2013.01); *E04H 17/10* (2013.01); *F16G 11/04* (2013.01); *E04H 17/24* (2013.01)

(58) Field of Classification Search
CPC ......... E04H 17/06; E04H 17/10; E04H 17/12; E04H 17/124; E04H 17/127; E04H 17/24; E04F 11/1859
See application file for complete search history.

(56) References Cited

U.S. PATENT DOCUMENTS

| 7,007,350 B1* | 3/2006 | Franke | A62B 35/04 |
| | | | 24/136 B |
| 7,581,909 B2* | 9/2009 | Szoke | B21F 9/00 |
| | | | 411/396 |
| 7,762,533 B2* | 7/2010 | DeRogatis | E04F 11/1853 |
| | | | 256/67 |
| 9,145,705 B2* | 9/2015 | Herman | E04F 11/1812 |
| 9,194,155 B2* | 11/2015 | Landry | E01F 13/028 |
| 9,249,577 B2* | 2/2016 | Ross | F16G 11/12 |
| 9,689,410 B2* | 6/2017 | Ostervig | E04H 17/24 |
| 9,932,754 B2* | 4/2018 | Schlatter | E04H 17/06 |
| 10,221,522 B1* | 3/2019 | Henderson | F16B 9/054 |
| 10,975,591 B2* | 4/2021 | Kennedy | E04H 17/12 |

(Continued)

FOREIGN PATENT DOCUMENTS

GB           994463 A * 6/1965 ............. E04C 5/122

*Primary Examiner* — Jonathan P Masinick
(74) *Attorney, Agent, or Firm* — Christopher Mayle; Bold IP, PLLC (57) ABSTRACT

A cable railing system is provided that includes cables connected to two or more supporting structures secured to a surface, for example vertical railing posts on a deck. The ends of the cables may be fitted with lag screws allowing the cable to be securely attached to the supporting structures. The lag screws have external threads that are larger than the diameter of the body where rotating the head component of the lag screws drive the lag screws into the supporting structures. The lag screws have a head component with a central bore and body component with a hollow cavity and an ending point whereby the cable is inserted into the hollow cavity through the central bore and positioned at the ending point where it then can be crimped in place and then tightened by twisting the head component.

20 Claims, 6 Drawing Sheets

(56) References Cited

U.S. PATENT DOCUMENTS

| | | | |
|---|---|---|---|
| 2007/0113491 A1* | 5/2007 | Royals | E02D 5/74 |
| | | | 52/161 |
| 2007/0269287 A1* | 11/2007 | Runge | F16B 25/0015 |
| | | | 411/378 |
| 2009/0022568 A1* | 1/2009 | Becker | F16B 25/0073 |
| | | | 411/386 |
| 2018/0023316 A1* | 1/2018 | Leary | E04H 17/04 |
| | | | 256/47 |
| 2019/0352928 A1* | 11/2019 | Kennedy | E04F 11/1859 |

* cited by examiner

CABLE RAILING SYSTEM AND METHOD OF INSTALLATION

CROSS-REFERENCE TO RELATED APPLICATIONS

This application claims priority to U.S. Provisional Application No. 62/558,240, filed on Sep. 13, 2017. The content of the above application is hereby expressly incorporated by reference herein in its entirety.

FIELD OF DISCLOSURE

The overall field of this invention is a cable railing system and method of installation. In particular, the embodiments are directed to a cable railing system that is simple in design, cost effective, and facilitates the installation of the cable railing while providing tension in the cable without twisting of the cable.

BACKGROUND

There are various types of cable railing systems on the market today, but most require the use of many components and provide a degree of difficulty in installation for the average person. Unable to install the railing system themselves, consumers may end up spending thousands of dollars because current railing systems are very labor intensive, even for professionals. Additionally, bulky designs commonly found on cable railing systems are not always aesthetically pleasing, with multiple connections of the cable fittings to the post, plank, or wall displayed in plain view. Traditionally, lag screws used in cable railing systems are difficult to attach to posts, planks, and walls, and once installed are only used as a termination point. There still exists a great need for a cable railing system that is cost effective, simpler to assemble, and delivers efficient uses for the components within.

SUMMARY

The disclosure presented herein relates to a cable railing system and method. More specifically, a cable railing system comprising, a first post and second post, a cable, a first lag screw connectable to the first post and the cable, the first lag screw comprising, a head component, a body component, the body component having a hollow cavity with an end, and right-handed threads, wherein the distance between crests of a right-handed thread of the right-handed threads is larger than the diameter of the body component, a second lag screw connectable to the second post and the cable comprising, a head component, a body component, wherein the body component comprises a hollow cavity with an end, and left-handed threads wherein the distance between crests of a left-handed thread is larger than the diameter of the body component.

It is an object of the present description to provide a method for assembly a cable railing system comprising, providing a first post and second post, a cable, a first and second lag screw, the first lag screw comprising, a head component, the head component having a central bore with a diameter of size to accommodate the cable a body component, the body component having a hollow cavity with an end, and right handed threads, wherein the distance between crests of a right handed thread of the right handed threads is larger than the diameter of the body component, the second lag screw comprising, a head component, the head component having a central bore with a diameter of size to accommodate the cable, a body component, the body component having a hollow cavity with an end, and left handed threads, wherein the distance between crests of a left handed thread of the left handed threads is larger than the diameter of the body component, securing the first lag screw into the first post and the second lag screw into the second post, positioning a first end of the cable through the central bore into the hollow cavity of the first lag screw so the cable extends outwardly from the face of the first post, positioning a second end of the cable through the central bore into the hollow cavity of the second lag screw so the cable extends outwardly from the face of the second post.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

Figure 1:
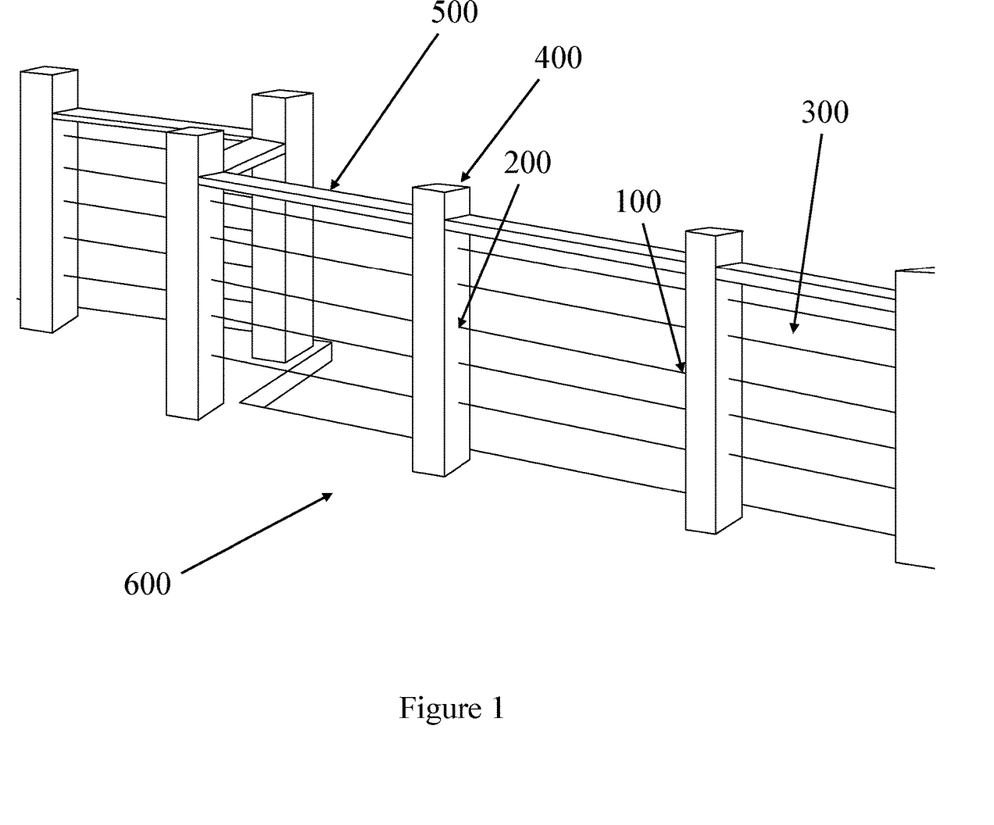
FIG. 1 is pictorial illustration of an exemplary embodiment for the cable railing system.

The present disclosure recognizes the unsolved need for a cable railing system that offers a simple, clean, and efficient way for installation that is not cost prohibitive and does not require complex or bulky components. Turning to FIG. 1, FIG. 1 illustrates one of the many possible embodiments of a cable railing system to surround a perimeter of a deck, floor, or balcony such as deck 600 or to enclose the sides of a stairway to list a few non-limiting examples of possible applications.

A cable railing system, according to an embodiment, may be comprised of two or more vertical posts such as vertical posts 400, which support a number of evenly or unevenly spaced cable rails. Further, the cable railing system, in one or more embodiments, may include at least one horizontal post or handrail extending between vertical posts 400 such as horizontal post 500, one or more cables such as cables 300 extending between vertical posts 400, and one or more fasteners such as fasteners 100, 200 that may be affixed to each vertical post. In one embodiment, Fasteners 100, 200 receive cables 300 and affix cables 300 to vertical posts 400. In other non-limiting embodiments, the vertical and horizontal posts shown in FIG. 1 may instead be replaced by planks, walls, or other suitable structures.

Vertical posts 400 are preferably made of wood and secured to a surface such as a deck or balcony floor (e.g. as shown in FIG. 1) by having fasteners (not shown) extending through the bottom surfaces of the vertical posts. In some embodiments, a vertical post is a corner post and may support a number of rails extending in a different direction from that shown for the rails in FIG. 1, such as at a right angle or approximately 90 degrees from the direction of the rails. In other non-limiting embodiments, there may be intermediate vertical posts that operate as a pass-through post whereby a cable, such as cable 300, is fastened to a first vertical post, passes through a hole in one or more intermediate vertical posts, and then is fastened to the second vertical post. In further embodiments, cables may be in a vertical orientation and are fastened to a first or second horizontal post, wall, or plank. Further the posts may be angled in any direction whereby the cables are also positioned at an equivalent angle perpendicular to the angle of the posts or any other angle depending on the cavities and measurements.

In one embodiment, cable 300 and fasteners 100, 200 are made from marine grade type 316 stainless steel. Alternatively, fasteners 100, 200 may be made of any material that provides suitable durability and corrosion resistance to protect from the outside elements.

Figure 2:
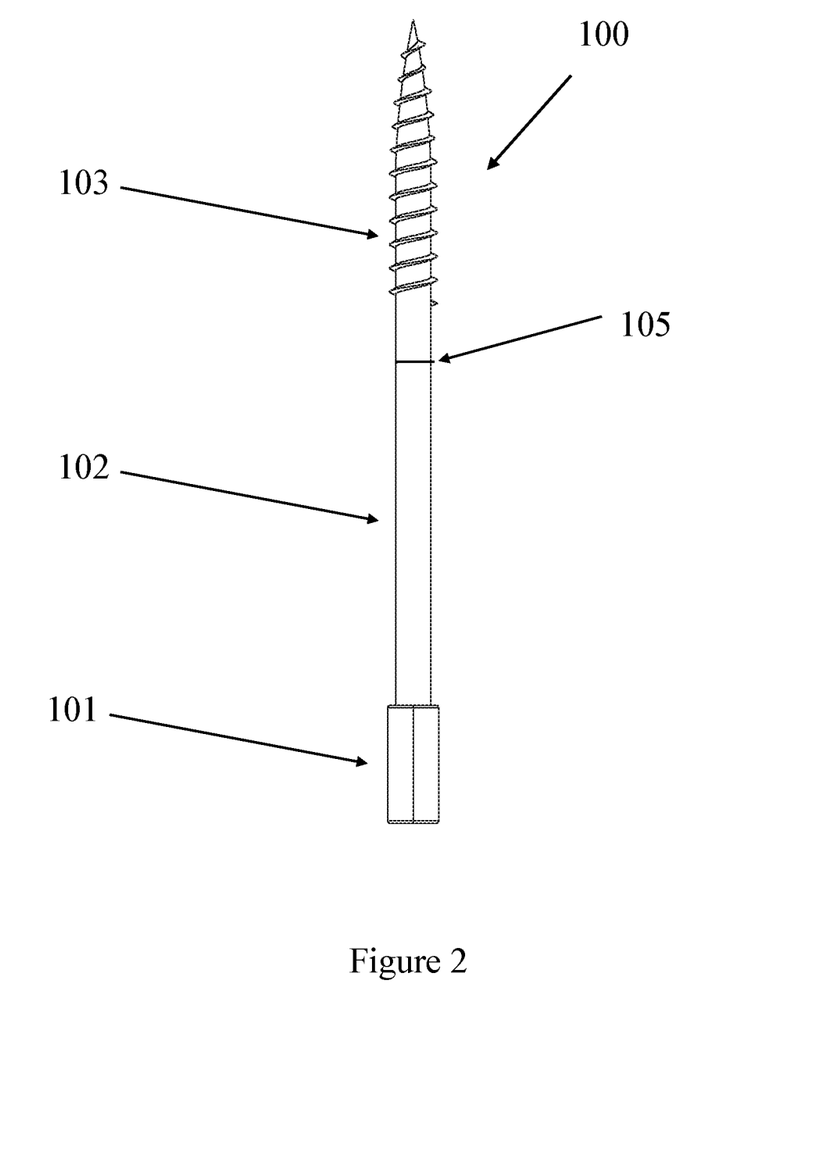
FIG. 2 is a side view of the right-handed cable railing fastener according to an illustrative embodiment.

FIG. 2 illustrates one embodiment of right-handed fastener 100 that may be used in a cable railing system in one or more embodiments. Fastener 100 may take the form of a modified lag screw and is referred to herein interchangeably as fastener or lag screw. Fastener 100 includes a body 102, a head component 101, and external threads 103. Head component 101 combined with external threads 103 of fastener 100 provide for facilitation of fastening a lag screw to a vertical post, such as vertical post 400. Fastener 100 (a.k.a lag screw) may vary in size to accommodate for different sizing of cables.

Figure 3:
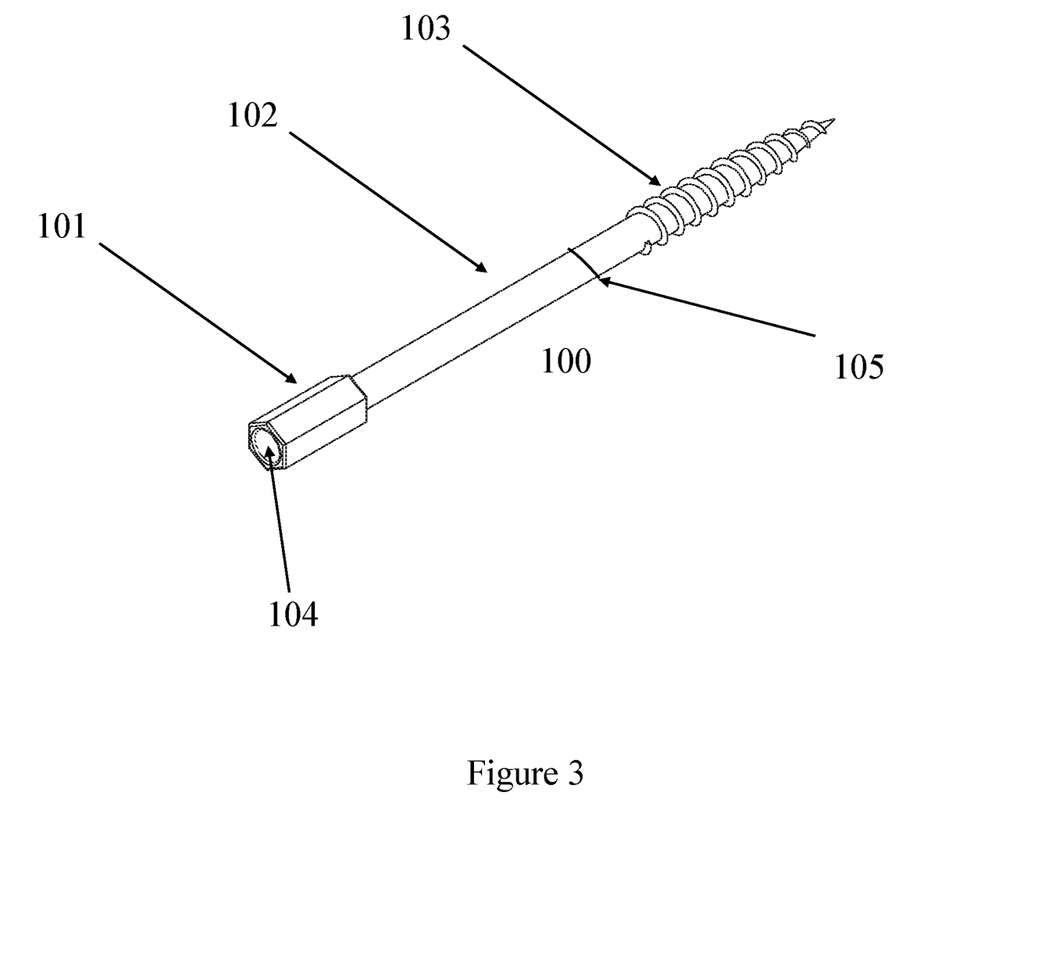
FIG. 3 is an isometric view of the right-handed cable railing fastener according to an illustrative embodiment.

At the first end of fastener 100 is head component 101. Head component 101 includes six planar faces formed on an exterior surface thereof. The six faces form a hexagonal shape. Head component 101 includes a central bore 104 as depicted in FIG. 3 therethrough for receiving a cable, such as cable 300 shown in FIG. 1. Although head component 101 is shown as a hexagonal head, any other shape such as a square, octagon, tetrahedron, circle, triangle, or rectangle, may alternatively be used instead. Head component 101 is used for installation of the fastener 100, 200 to vertical posts 400 whereby head component 101 is rotated thereby driving fastener 100, 200 into vertical posts 400. Head component 101 further is used to tighten cables 300 after fasteners 100, 200 are connected to vertical post 400 and cables 300 are crimped to fasteners 100, 200.

Body 102 is elongated and cylindrical in shape whereby body 102 includes a hollow cavity with an ending point having a diameter wide enough to accommodate the thickness of cable 300, extending beyond head component 101. Body 102 may have a line 105 around its surface at the ending point of the hollow cavity. Such a line 105 may be useful for measurement of the desired cable length of cable 300 to ensure a proper fit of fastener/lag screw 100. Once cable 300 is wedged into position within body 102, a crimp may be used to squeeze body 102 down on to the end of cable 300 that is extending through the hollow cavity or bore 104 of body 102 to retain cable 300 in tension relative to body 102. Additionally, the hollow cavity or bore 104 may be straight or may be tapered in in various embodiments.

Figure 4:
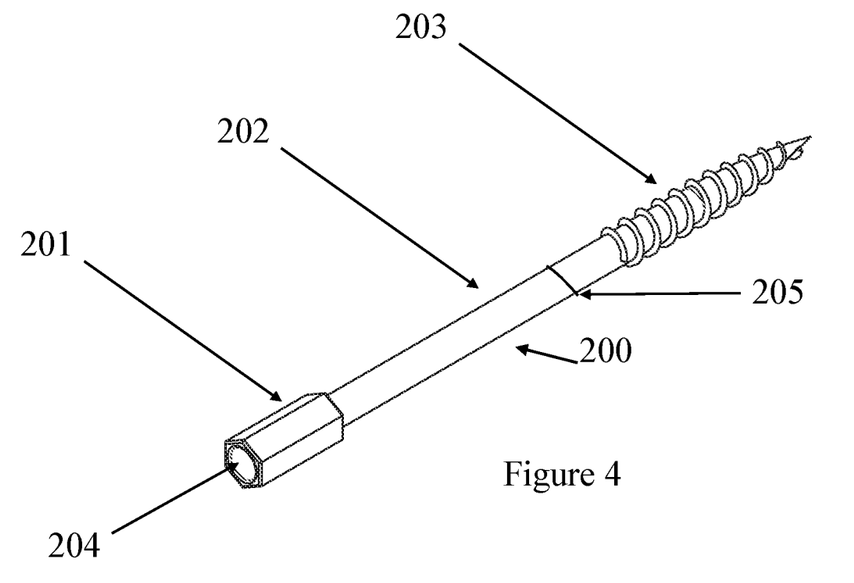
FIG. 4 is an isometric view of the left-handed cable railing fastener according to an illustrative embodiment.

External threads 103 on lag screw 100 includes crests at the top and bottom of each thread. The length between the zenith and nadir of the crests on the top and bottom of the thread is greater than the diameter of body 102. In an embodiment, a cable railing system has at least one pair of fasteners that are identical in generally all aspects with the main difference being opposite directing threads. One thread has clockwise thread rotation (right handed) 103 to be affixed to one vertical post 400 in the cable railing system and one thread has counterclockwise thread motion (left handed) 203 (as shown in FIG. 4) to be affixed to another vertical post 400.

Figure 5:
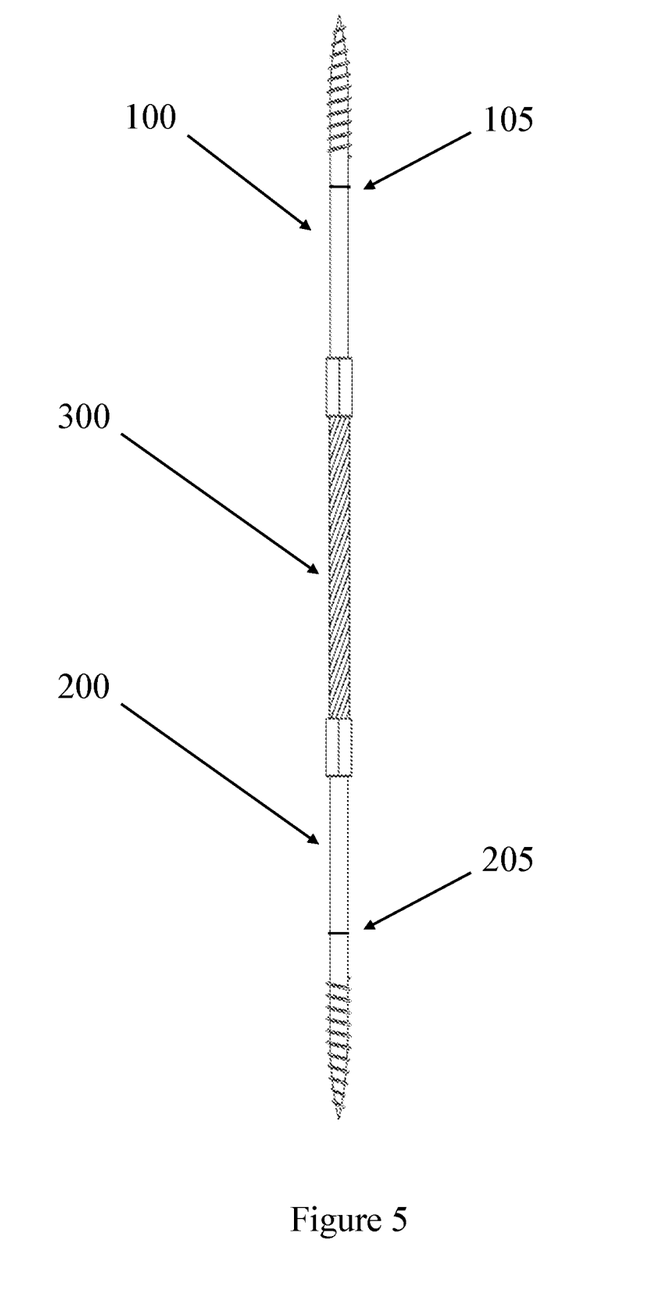
FIG. 5 is a pictorial illustration of a right-handed cable fastener and left-handed cable fastener with the cable inserted between the two fasteners according to an illustrative embodiment.

Typically, the common direction, or handedness, for screw threads is right-handedness. The right-handed fastener 100 in the cable railing system tightens when head component 101 is turned clockwise, as viewed from overhead, while turning head component 101 counterclockwise loosens or removes fastener 100. Fastener 200 shown in FIG. 2 is a left-handed fastener. Accordingly, unlike right handed fastener 100, fastener 200 in a cable railing system, according to one or more embodiments, may be loosened or removed when head component 201 is turned clockwise, whereas turning head component 201 counterclockwise tightens fastener 200. Embodiments of right-handed lag screw 100 and left-handed lag screw 200 are depicted in FIG. 5 with cable 300 connected between the two fasteners.

Figure 6:
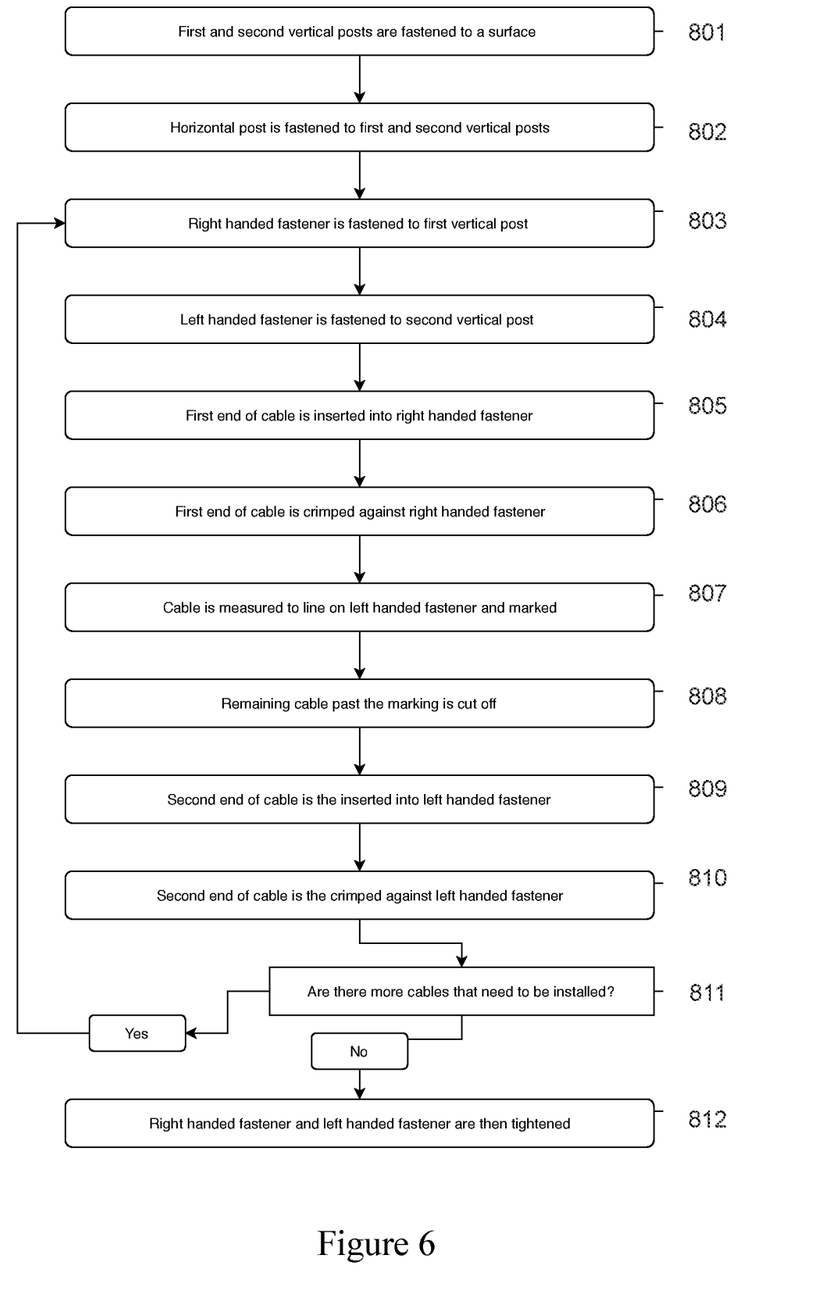
FIG. 6 is a flowchart detailing the steps of installing the cable railing system.

In a method of installation of a cable railing system, as described in FIG. 6, first and second vertical posts 400 may be fastened to a surface (e.g. deck 600) at step 801. Further, a horizontal post, such as horizontal post 500, is fastened to first and second vertical posts 400 at step 802. A right-handed fastener, such as right-handed fastener 100, is fastened to first vertical post 400 by rotating head component 101 to drive right handed fastener 100 into vertical post 400 at the desired height at step 803. Further, a left-handed fastener 200 is fastened to second vertical post 400 by rotating head component 201 to drive left handed fastener 200 into vertical post 400 at an equal height to right handed fastener 100 at step 804.

A first end of cable 300 is then inserted into right-handed fastener 100 at step 805. The first end of cable 300 may be extended through central bore 104 that extends through head component 101 and further into body 102 of right-handed fastener 100 until cable 300 is positioned at the end of the hollow cavity in body 102 of right-handed fastener 100. Cable 300 and body 102 are then squeezed by a set of crimping pliers (or any other tools known by those skilled in the art) at step 806. A first end of cable 300 is subsequently retained in tension relative to body 102 of right-handed fastener 100 after being squeezed in place.

A second end of cable 300 is then brought next to left-handed fastener 200 and is measured to a line 205, as shown on FIG. 4 that may be located on body 202 of left handed fastener 200 at step 807. A marking is placed at the section of cable 300 of equal distance to line 205. Cable 300 is then cut at the marking by a set of wire cutters or any other suitable tool known to those skilled in the art at step 808. Further, the second end of cable 300 is then inserted into left handed fastener 200 and extended through central bore 204 of head component 201 and into body 202 until cable 300 is positioned at the end of the hollow cavity in body 202 at step 809. The second end of cable 300 and body 202 are then squeezed by a set of crimping pliers or other suitable tools such that cable 300 is retained in tension relative to body 202 at step 810. This exemplary process may be repeated for each cable of the set of cables 300 using more cable fasteners, such as cable fasteners 100, 200 at step 811. The term "set" as used herein may refer to one or more item.

Further, starting with cable 300 closest to the midpoint of vertical post 400, right-handed fastener 100 and left-handed fastener 200 are tightened by twisting their head components 101 and 201, respectively, with a wrench or other useful tool such that cable 300 is tightened to a desired level at step 812. The same procedure is then repeated on alternating cables above and below the center cable, continuing until the cables at the top and bottom of the system are tightened.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the above claims.

What is claimed is:

1. A cable railing system comprising:
   a first post and second post;
   a cable;
   a first lag screw that is connectable to the first post and the cable, the first lag screw comprising, a head component, a body component, the body component having a hollow cavity with an end, and right-handed threads, wherein a distance between crests of a right-handed thread of the right-handed threads is larger than a diameter of the body component; and
   a second lag screw that is connectable to the second post and the cable comprising, a head component, a body component, wherein the body component comprises a hollow cavity with an end, and left-handed threads wherein a distance between crests of a left-handed thread of the left-handed threads is larger than a diameter of the body component.

2. The cable railing system of claim 1, the head component of the first lag screw and the second lag screw having a central bore with a diameter of size to accommodate the cable.

3. The cable railing system of claim 1, wherein the first lag screw and the second lag screw are made of marine grade type 316 stainless steel.

4. The cable railing system of claim 1, further comprising a plurality of spaced intermediate posts positioned between the first post and the second post configured to allow the cable to pass through apertures in the plurality of spaced intermediate posts.

5. The cable railing system of claim 1, wherein the first lag screw and the second lag screw have a longitudinal axis that is at an angle to a face of the first post and the second post.

6. The cable railing system of claim 1, further comprising a third post extending between the first post and the second post.

7. The cable railing system of claim 1, wherein the first post and the second post are connected to a surface.

8. The cable railing system of claim 1, wherein a exterior surface of the head component of the first lag screw and the second lag screw comprises three or more planar faces.

9. The cable railing system of claim 1, wherein the hollow cavity of the body component of the first lag screw and the second lag screw is tapered.

10. A method for assembly a cable railing system comprising:
    providing a first post and second post, a cable, a first lag screw and second lag screw, the first lag screw comprising, a head component, the head component having a central bore with a diameter of size to accommodate the cable, a body component, the body component having a hollow cavity with an end, and right handed threads, wherein a distance between crests of a right handed thread of the right handed threads is larger than a diameter of the body component, the second lag screw comprising, a head component, the head component having a central bore with a diameter of size to accommodate the cable, a body component, the body component having a hollow cavity with an end, and left handed threads, wherein the distance between crests of a left handed thread of the left handed threads is larger than the diameter of the body component;
    securing the first lag screw into the first post and the second lag screw into the second post;
    positioning a first end of the cable through the central bore into the hollow cavity of the first lag screw so the cable extends outwardly from a face of the first post; and
    positioning a second end of the cable through the central bore into the hollow cavity of the second lag screw so the cable extends outwardly from the face of the second post.

11. The method of claim 10, further comprising, rotating the head component of the first lag screw to drive the first lag screw into the first post and rotating the head component of the second lag screw to drive the second lag screw into the second post.

12. The method of claim 10, further comprising, measuring a length of the cable to a line on the body component of the first lag screw to a second line on the body component of the second lag screw, the line of the first lag screw at the end of the hollow cavity on the first lag screw, the line of the second lag screw at the end of the hollow cavity on the second lag screw.

13. The method of claim 12, further comprising, marking a section of the cable with a marking, wherein the marking is of equal distance to the line on the first lag screw and the line on the second lag screw.

14. The method of claim 13, further comprising, cutting the cable at the marking.

15. The method of claim 10, further comprising, crimping the first lag screw and the second lag screw onto the cable.

16. The method of claim 10, further comprising, tightening the head component of the first lag screw and the second lag screw to tighten the cable.

17. The method of claim 10, further comprising, securing the first post and the second post to a surface.

18. The method of claim 10, further comprising, securing a third post to the first post and the second post, the third post extending between t the first post and the second post.

19. The method of claim 10, further comprising, passing the cable through one or more intermediate posts, the one or more intermediate posts having apertures for the cable to pass through.

20. A cable railing system comprising:
   a cable;
   a first lag screw that is connectable to a first end of the cable, the first lag screw comprising, a head component, a body component, the body component having a hollow cavity with an end, and right-handed threads, wherein a distance between crests of a right-handed thread of the right-handed threads is larger than a diameter of the body component; and
   a second lag screw that is connectable to a second end of the cable comprising, a head component, a body component, wherein the body component comprises a hollow cavity with an end, and left-handed threads wherein a distance between crests of a left-handed thread of the left-handed threads is larger than a diameter of the body component.

\* \* \* \* \*